(12) United States Patent
Li et al.

(10) Patent No.: US 9,832,091 B2
(45) Date of Patent: Nov. 28, 2017

(54) RADIO FREQUENCY SPECTRUM MANAGEMENT APPARATUS, METHOD, SYSTEM AND SECONDARY USER APPARATUS

(71) Applicant: Sony Corporation, Minato-ku (JP)

(72) Inventors: Songpeng Li, Beijing (CN); Youping Zhao, Beijing (CN)

(73) Assignee: SONY CORPORATION, Tokyo (JP)

(*) Notice: Subject to any disclaimer, the term of this patent is extended or adjusted under 35 U.S.C. 154(b) by 166 days.

(21) Appl. No.: 14/456,225

(22) Filed: Aug. 11, 2014

(65) Prior Publication Data

US 2015/0092700 A1 Apr. 2, 2015

(30) Foreign Application Priority Data

Sep. 27, 2013 (CN) .......................... 2013 1 0452823

(51) Int. Cl.
*H04W 72/08* (2009.01)
*H04L 12/26* (2006.01)
(Continued)

(52) U.S. Cl.
CPC ......... *H04L 43/0829* (2013.01); *H04W 16/14* (2013.01); *H04W 64/006* (2013.01); *H04W 72/048* (2013.01)

(58) Field of Classification Search
CPC .. H04W 72/085; H04W 16/10; H04L 43/0829
See application file for complete search history.

(56) References Cited

U.S. PATENT DOCUMENTS

| 2004/0092281 | A1* | 5/2004 | Burchfiel | H04B 7/0408 |
| | | | | 455/522 |
| 2010/0081449 | A1* | 4/2010 | Chaudhri | H04W 72/082 |
| | | | | 455/452.2 |

(Continued)

OTHER PUBLICATIONS

Niels Hoven and Anant Sahai, Power Scaling for Cognitive Radio, 2005 International Conference on Wireless Networks, Communications and Mobile Computing, Jun. 13, 2005, IEEE vol. 1, pp. 250-255.*

(Continued)

*Primary Examiner* — Mohammad Adhami
*Assistant Examiner* — Shailendra Kumar
(74) *Attorney, Agent, or Firm* — Oblon, McClelland, Maier & Neustadt, L.L.P.

(57) ABSTRACT

The present disclosure provides a radio frequency spectrum management apparatus, method, system and secondary user apparatus for a cognitive radio system comprising primary systems and secondary systems, the radio frequency spectrum management apparatus comprises circuitry configured to: acquire, according to position variation information of respective secondary user groups in the secondary systems, path loss information at the positions before and after the movement of respective secondary user groups respectively, wherein, the secondary user group comprises one or more secondary users; and determine an adjustment to the usage of frequency spectrums of the secondary users, according to the variation of the path loss information at the positions before and after the movement of respective secondary user groups. The present disclosure may at least improve the efficiency of adjusting the frequency spectrum resource.

19 Claims, 7 Drawing Sheets

(51) Int. Cl.
*H04W 16/14* (2009.01)
*H04W 72/04* (2009.01)
*H04W 64/00* (2009.01)

(56) References Cited

U.S. PATENT DOCUMENTS

| | | | | |
|---|---|---|---|---|
| 2012/0282962 A1* | 11/2012 | Madon | ............ | H04W 16/04 |
| | | | | 455/509 |
| 2013/0324166 A1* | 12/2013 | Mian | ............ | H04W 4/021 |
| | | | | 455/457 |
| 2014/0016494 A1* | 1/2014 | Van Phan | ............ | H04W 24/08 |
| | | | | 370/252 |

OTHER PUBLICATIONS

Kentaro Nishimori et al., Spatial opportunity for cognitive radio systems with heterogeneous path loss conditions, IEEE Vehicular Techology Conference proceedings, Apr. 1, 2007, IEEE, pp. 2631-2635.*

* cited by examiner

RADIO FREQUENCY SPECTRUM MANAGEMENT APPARATUS, METHOD, SYSTEM AND SECONDARY USER APPARATUS

FIELD OF THE INVENTION

The present disclosure generally relates to the frequency spectrum resource management in the radio communication, and in particular to a radio frequency spectrum management apparatus, method, system and secondary user apparatus for a cognitive radio system comprising primary systems and secondary systems.

BACKGROUND OF THE INVENTION

With the development of wireless communication technology, frequency spectrum resources are increasingly strained. In practical use, the resource utilization ratio of the allocated authorized frequency spectrum is generally not high. Therefore, cognitive radio technique is widely used currently to improve the actual utilization ratio of the frequency spectrum. Although the introduction of the cognitive radio technique may improve the problem of shortage of spectrum resources, signals transmitted from a cognitive user (a secondary user in a secondary system, SU) may disturb a primary user (PU) in the same frequency band, since different modulated signals are transmitted in the same frequency band. Hence, a cognitive system algorithm core server has to be established to use an advanced cognitive algorithm to determine available frequency spectrum for each cognitive user (e.g. operating frequency, transmitting power), thereby ensuring the normal communication of the primary user. For example, as for the frequency spectrum resource in the broadcast television spectrum bands, a television user is an authorized primary user, and a user who uses the frequency band for communication, such as a WIFI user, is a secondary user. It should be ensured that the usage of the spectrum resources in the broadcast television spectrum bands by the WIFI user does not harm the television user. However, when the position of the secondary user changes, the existing cognitive algorithm usually needs to reconfigure the usage of the frequency spectrum of all the cognitive users to make it meet the disturbance tolerance of the primary user, which leads to lower allocative efficiency of the wireless communication system.

SUMMARY OF THE INVENTION

A brief overview of the disclosure is given hereinafter, in order to provide a basic understanding regarding some aspects of the disclosure. It should be understood that this overview is not exhaustive overview of the disclosure and is not intended to determine the key or critical part of the disclosure and is not intended to limit the scope of the disclosure. The object of the overview is only to give some concepts in a simplified form as a prelude to the more detailed description that is discussed later.

In view of the above-mentioned disadvantage in the prior art, one of the objects of the disclosure is to provide a radio frequency spectrum management apparatus, method, system and secondary user apparatus for a cognitive radio system comprising primary systems and secondary systems, so as to overcome the problem in the prior art.

According to one embodiment of the disclosure, there is provided a radio frequency spectrum management apparatus for a cognitive radio system comprising primary systems and secondary systems, the radio frequency spectrum management apparatus comprising circuitry, configured to: acquire, according to position variation information of respective secondary user groups in the secondary systems, path loss information at the positions before and after the movement of respective secondary user groups respectively, wherein, the secondary user group includes one or more secondary users; and determine an adjustment to the usage of frequency spectrums of the secondary user groups, according to the variation of the path loss information at the positions before and after the movement of respective secondary user groups.

According to another embodiment of the disclosure, there is provided a secondary user apparatus, comprising: circuitry to receive frequency spectrum adjusting information determined based on path loss information of the secondary user apparatus, wherein, the secondary user apparatus performs an adjustment to its usage of the frequency spectrum based on the frequency spectrum adjusting information, so that the adjusted usage of frequency spectrum of the secondary user apparatus satisfies with the disturbance tolerance of primary systems.

According to yet another embodiment of the disclosure, there is provided a radio frequency spectrum management method for a cognitive radio system comprising primary systems and secondary systems, the radio frequency spectrum management method including: acquiring, according to position variation information of respective secondary user groups in the secondary systems, path loss information at the positions before and after the movement of respective secondary user groups respectively, wherein, the secondary user group includes one or more secondary users; and determining an adjustment to the usage of frequency spectrums of the secondary user groups, according to the variation of the path loss information at the positions before and after the movement of respective secondary user groups.

According to still another embodiment of the disclosure, there is provided a secondary user apparatus, including: a path loss information acquiring device configured for acquiring path loss information of a predetermined range of a movement destination for the secondary user apparatus according to the movement destination; and a target position determining device configured for determining the movement target position of the secondary user apparatus based on the path loss information, so that the usage of frequency spectrum after the secondary user apparatus moves to the movement target position satisfies with the disturbance tolerance of the primary systems.

According to still another embodiment of the disclosure, there is provided a radio frequency spectrum management system for a cognitive radio system comprises primary systems and secondary systems, the radio frequency spectrum management system comprising a radio frequency spectrum management apparatus and one or more secondary user groups, wherein, the radio frequency spectrum management apparatus comprises: a path loss information acquiring device configured for acquiring, according to position variation information of respective secondary user groups in the secondary systems, path loss information at the positions before and after the movement of respective secondary user groups respectively, wherein, the secondary user group includes one or more secondary users; and a frequency spectrum adjustment determining device configured for determining an adjustment to the usage of frequency spectrums of the secondary user groups, according to the variation of the path loss information at the positions before and after the movement of respective secondary user groups, including determining secondary user groups whose usage of frequency spectrum needs to be adjusted; the radio frequency spectrum management apparatus is further configured for transmitting available frequency spectrum information related to secondary user groups determined as those whose usage of frequency spectrum needs to be adjusted; each secondary user apparatus of the secondary user group includes a receiving device configured for receiving the available frequency spectrum information, and the secondary user apparatus performs an adjustment to its usage of frequency spectrum based on the available frequency spectrum information, so that the adjusted usage of the frequency spectrum of the secondary user apparatus satisfies with the disturbance tolerance of the primary systems.

Moreover, an embodiment of the disclosure further provides a computer program for implementing the above-mentioned radio frequency spectrum management method.

Furthermore, an embodiment of the disclosure further provides a corresponding computer-readable storage medium with the computer program code for implementing the above-mentioned radio frequency spectrum management method being stored thereon.

The above-mentioned radio frequency spectrum management apparatus, method, system and secondary user apparatus according to the embodiments of the disclosure can achieve at least one of the following advantageous effects, i.e. improvement in the allocative efficiency of the frequency spectrum resources and reduction in the system overhead.

Preferable embodiments of the disclosure are illustrated in detail in conjunction with the drawings in the following, to make the above-mentioned and other advantages of the disclosure more obvious.

BRIEF DESCRIPTION OF THE DRAWINGS

The disclosure may be better understood by referring to the following description given in conjunction with the accompanying drawings. The same or similar reference numerals are used throughout the drawings to denote the same or like elements. The accompanying drawings together with the following detailed description are contained in the specification and form part of the specification, for further illustrating the preferable embodiments of the disclosure and explaining the principles and advantages of the disclosure, in which.

The skilled in the art should appreciate that the elements in the accompanying figures are illustrated merely for simplicity and clarity, and are not necessarily drawn to scale. For example, the dimensions of some of the elements in the accompanying drawings may be enlarged relative to other elements, to facilitate the understanding of embodiments of the disclosure.

DETAILED DESCRIPTION OF THE INVENTION

Hereinafter, exemplary embodiments of the disclosure are described in connection with the accompanying drawings. For clarity and brevity, not all features of the actual embodiments are described in the specification. However, it should be understood that many embodiment-specific decisions have to be made during the development of the actual embodiments, in order to achieve the specific goal of the developer. For example, the embodiment-specific decisions may be restrictions related to and compliance with systems and services, and these restrictions may vary for different embodiments. Furthermore, it should also be understood that, for those skilled in the art that benefits from this disclosure, such developing work is merely a routine task, although the developing work may be very complex and time consuming.

It should be noted herein that only apparatus structures and/or process steps closely related to the solution according to the disclosure are illustrated in the accompanying drawings and other details that are not so related to the disclosure are omitted, in order to avoid obscuring the disclosure due to unnecessary details.

As for a cognitive radio system includes primary systems and secondary systems and with respect to variation in the positions of the secondary users in the secondary systems, the disclosure provides a radio frequency spectrum management apparatus, method, system and corresponding secondary user apparatus for determining those whose usage of frequency spectrum needs to be adjusted according to the variation in the path loss at the positions before and after the movement of the secondary user. According to the disclosure, the primary system may be a system with the right to use the licensed frequency spectrum and typically includes a primary base station and a primary user. Accordingly, the secondary system may be a system without the right to use the licensed frequency spectrum and typically includes a secondary base station and a secondary user. According to another embodiment of the disclosure, the primary system may also be a system with the right to use the frequency spectrum as the secondary system, but with higher priority in using the frequency spectrum than the second system. The concept of the primary system and the secondary system are well-known in the art, which are not described herein in detail.

Figure 1:
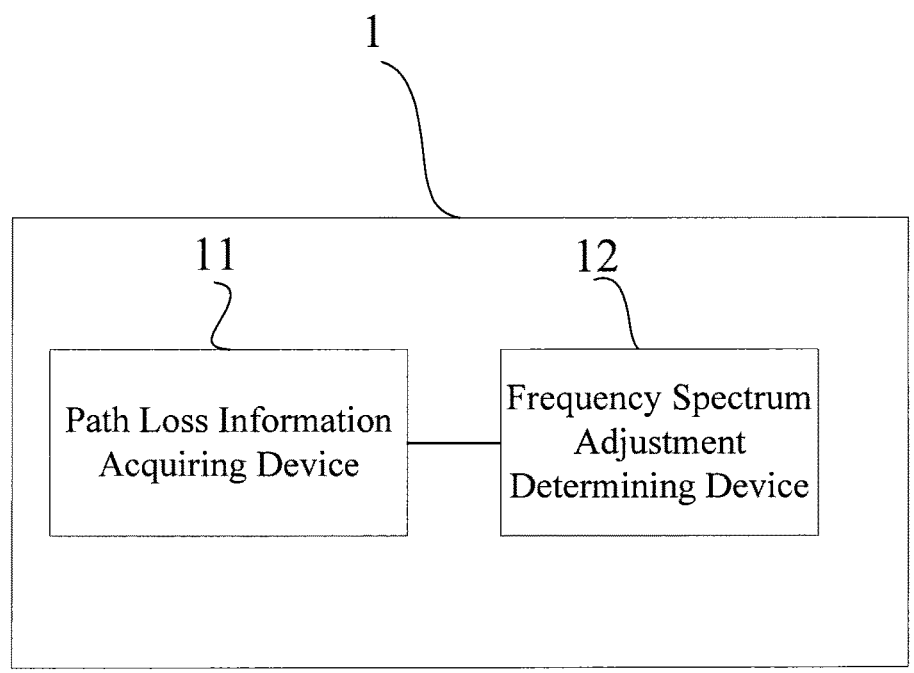
FIG. 1 is an exemplary structural block diagram schematically illustrating a radio frequency spectrum management apparatus according to an embodiment of the disclosure.

FIG. 1 is an exemplary structural block diagram schematically illustrating a radio frequency spectrum management apparatus according to an embodiment of the disclosure.

As shown in FIG. 1, the radio frequency spectrum management apparatus 1 according to an embodiment of the disclosure is used for a cognitive radio system including primary systems and secondary systems. The radio frequency spectrum management apparatus 1 includes: a path loss information acquiring device 11 configured for acquiring, according to position variation information of respective secondary user groups in the secondary systems, path loss information at the positions before and after the movement of respective secondary user groups respectively, wherein, the secondary user group includes one or more secondary users; and a frequency spectrum adjustment determining device 12 configured for determining an adjustment to the usage of frequency spectrums of the secondary user groups, according to the variation of the path loss information at the positions before and after the movement of respective secondary user groups.

According to a preferable embodiment of the disclosure, the secondary user groups are divided in terms of distances between respective secondary users and a predetermined reference point and/or the path loss. According to the embodiment of the disclosure, the secondary user groups may be divided by the radio frequency spectrum management apparatus 1. For example, each secondary user may report its position and/or its transmitting power to the radio frequency spectrum management apparatus 1, and then the radio frequency spectrum management apparatus 1 divides the secondary user groups in terms of the information of the position and/or the information of the transmitting power of the secondary user and determines the positions of the groups.

Specifically, a representative secondary user in the secondary user groups may be determined as the reference point, and then the secondary user groups are divided in terms of the distance between other secondary user and the reference point and the path loss similarities. The representative secondary user may be selected according to geographical position (the spatial domain) or path loss (the power domain). For example, a secondary user near the center of a certain region may be selected as the representative secondary user or a secondary user whose path loss is close to the mid-value of a certain path loss interval may be selected as the representative secondary user.

For example, the secondary users whose distances from the reference point are all less than a first predetermined threshold value and whose path losses to the reference point are all less than a second predetermined threshold value may be divided into a secondary user group. The skilled in the art may understand that the first predetermined threshold value and the second predetermined threshold value may be predetermined according to the actual application scenario, the features of the secondary users and so on. For example, the first predetermined threshold value should be much less than the distance from the reference point to the primary system, and the second predetermined threshold value should be much less than the path loss from the reference point to the primary system. In a preferable embodiment, multiple secondary users whose actual physical positions (determined according to the distance) or whose virtual positions (determined according to the path loss) are close to each other may be aggregated together into one secondary user group. In this way, when the position of the secondary user changes and whether its usage of frequency spectrum needs to be adjusted has to be determined, it is only needed to calculate whether the effect of the individual group as a whole on the primary system changes, rather than calculating the effect of the multiple secondary users on the primary system respectively, thereby saving the system overhead. As an alternative embodiment of the invention, each secondary user may be directly considered as one secondary user group, for example, in the case of a small number of secondary users, thereby saving the computing resource for dividing the secondary user group. Furthermore, with the increase in the number of secondary users, multiple secondary users may be combined together to obtain less secondary user groups. Therefore, in the cognitive radio system according to the disclosure, the secondary user group may include one or more secondary users.

According to the disclosure, in the case where the secondary user group includes one secondary user, the position of the secondary user group refers to a position where the secondary user is located. In the case where the secondary user group includes two or more secondary users, the position of the secondary user group refers to the position of the group formed by the multiple secondary users corresponding to multiple positions. For example, the position of the geometric center of all the secondary users in one secondary user group may be used as the position of the secondary user group. However, the present invention is not limited thereto. According to a preferable embodiment of the present invention, a reference point (e.g., a reference point initially used for determining the group member) may also be determined for each secondary user group, and the position of the secondary user group may be determined according to the distance between each secondary user and the reference point and the weight of each secondary user in the secondary user group. The weight of a secondary user in the secondary user group may be determined according to the transmitting power of the secondary user, for example. For example, a higher weight may be assigned to a secondary user with larger transmitting power, and a lower weight may be assigned to a secondary user with lower transmitting power.

The path loss information at the position where the secondary user is located includes the path loss from the position of the secondary user to the primary system. According to one embodiment of the disclosure, the path loss information at a first position may be acquired by the path loss information acquiring device 11 of the radio frequency spectrum management apparatus 1, according to the received signal of the secondary user group at the first position.

In a preferable embodiment, the path loss information acquiring device 11 acquires the path loss information at a first position where a secondary user group is located according to a signal transmitted from a representative secondary user in the secondary user group. For example, the representative secondary user in the secondary user group may be a secondary user in the group closest to the first position or a most representative secondary user determined in consideration of both the distance to the first position and the transmitting power.

In an implementation, the representative secondary user may transmit its position information to the radio frequency spectrum management apparatus and then calculate the path loss information according to the receiving power of a received signal fed back from the radio frequency spectrum management apparatus 1 and the transmitting power contained in the signal and transmit the path loss information to the radio frequency spectrum management apparatus 1

(preferably, simultaneously with the next transmission of the position information). In this way, the path loss information acquiring device 11 of the radio frequency spectrum management apparatus 1 may acquire the path loss information at the first position according to the received signal of the secondary user group. In another implementation, the signal transmitted from the representative secondary user and including its position information further includes the information of the power for transmitting the signal by the secondary user. The path loss information acquiring device 11 of the radio frequency spectrum management apparatus 1 may determine the path loss information at the first position where the secondary user group is located according to the receiving power and the transmitting power of the received signal of the secondary user group.

In the present invention, the path loss information at various positions is acquired for rapid estimation of disturbance of the secondary system on the primary system at various positions. Therefore, it is preferable that the above-mentioned path loss information is the path loss from each position to the primary system. In this case, the radio frequency spectrum management apparatus 1 is preferably located near the primary system. In an optional embodiment, the radio frequency spectrum management apparatus 1 may be separated from the primary system, but the measured path loss is usually converted to the path loss to the primary system.

According to another embodiment of the disclosure, the radio frequency spectrum management apparatus 1 may obtain in advance the path loss from each position to the primary system by estimating the path loss at each position using a radio wave propagation model. According to the disclosure, the radio wave propagation models that may be used include the Okumura-Hata model, the COST-231 Hata model, the COST231-Walfisch-Ikega mi model and the like.

In order for more accurate channel estimation in the case of cognitive radio (CR), the disclosure proposes a channel model applicable for the case of CR. Through the analysis of the path loss, the inventor found that the path loss PL (dB) is related to the distance d between the receiving apparatus and the wireless apparatus (in the disclosure, e.g. the distance between the radio frequency spectrum management apparatus 1 and each secondary user group or secondary user) and the frequency f and is in direct proportion to their logarithm. Accordingly, the channel model in accordance with the preferred embodiment of the disclosure may be represented by using the following equation (1):

$$PL = A*LOG_{10}(d) + B*LOG_{10}(f) + C \quad (1)$$

wherein, A and B are coefficients and C is a correction factor.

The coefficients A and B and the correction factor C in the equation (1) may be determined by performing a measurement experiment. In the measurement experiment, the path loss is measured in various environments both indoor and outdoor (such as a high building, a low building, beside a street or beside a pond), with the signal transmitter being used for transmitting a signal and a frequency spectrum analyzer being used for receiving.

The linear regression analysis is performed on the measured data, and the channel models in different measurement environments may be obtained, as shown in Table 1.

TABLE 1

| Measurement environment | | Path loss model (dB) |
|---|---|---|
| Outdoor | Around the building LOS (Line-of-sight) | PL = 27.9lg(d) + 23.2lg(f) − 41.4 |
| | NLOS (Non-line-of-sight) | PL = 53.2lg(d) + 26.5lg(f) − 85.2 |
| | Around the pond LOS (Line-of-sight) | PL = 20.2lg(d) + 49.9 (f = 2401 MHz) |
| Indoor | Room-corrido (NLOS) (Non-line-of-sight) | PL = 37.0lg(d) + 15.7lg(f) − 13.5 | wherein, the unit of the distance "d" is "m" and the unit of the frequency f is "MHz".

The path loss is predicted by using, the channel model (CR model) according to the disclosure, the existing Okumura-Hata model, the existing COST-231 Hata model and the existing COST231-Walfisch-Ikega mi model, respectively and the prediction results were compared. Table 2 lists the results of the means and root mean squares in the case of error prediction by using the four models with f=530 MHz.

TABLE 2

| Channel model | σ (dB) | μ (dB) |
|---|---|---|
| Okumura-Hata | 7.6 | −8.5 |
| COST-231 Hata | 7.6 | −9.3 |
| COST231-Walfisch-Ikegami | 16.7 | 16.1 |
| CR | 4.1 | −3.6 | wherein, "μ" is the mean of the prediction error and "σ" is the root mean square of the prediction error. Prediction error of the path loss is defined as the actual path loss subtracted by the path loss value predicted by using the above-mentioned propagation model.

As can be seen from Table 2, compared to the path loss predicted by using the conventional Okumura-Hata model, COST-231 Hata model and COST231-Walfisch-Ikega mi model, the prediction error of the CR channel model according to the disclosure is smaller, i.e., the predicted path loss value is more accurate.

In a preferable embodiment, the radio frequency spectrum management apparatus 1 may store in a path loss database the path loss at various positions (including each path loss information acquired individually) which is actually measured or which is predicted by using a radio propagation model (preferably, the CR channel model according to the disclosure). In this case, the path loss information acquiring device 11 of the radio frequency spectrum management apparatus 1 is configured for acquiring, according to position variation information of respective secondary user groups, path loss information at the positions before and after the movement of respective secondary users respectively from the predetermined path loss database. The obtained path loss information at various positions is stored, therefore, in the case where the position reported by the user is among the positions already stored in the path loss database, the radio frequency spectrum management apparatus 1 may directly acquire the relevant path loss information by searching the database, thereby reducing the steps for calculating the path loss and improving the efficiency in the management of the radio frequency spectrum management apparatus.

As shown in FIG. 1, after the path loss information acquiring device 11 acquires, for a secondary user group whose position is changed, the path loss information at the positions before and after the movement of the secondary user group, the frequency spectrum adjustment determining device 12 determines an adjustment to the usage of frequency spectrums of the secondary user group, according to the variation of the path loss information.

The determination of the adjustment to the usage of frequency spectrums of the secondary user group may include: the frequency spectrum adjustment determining device 12 determines the secondary user group whose usage of frequency spectrum needs to be adjusted, according to the variation of the path loss information; alternatively, the frequency spectrum adjustment determining device 12 may also determine the secondary user group whose usage of frequency spectrum needs to be adjusted and the specific way for the adjustment of the secondary user group, including but not limited to increasing or reducing the transmitting power of the secondary user group, for example.

Figure 2:
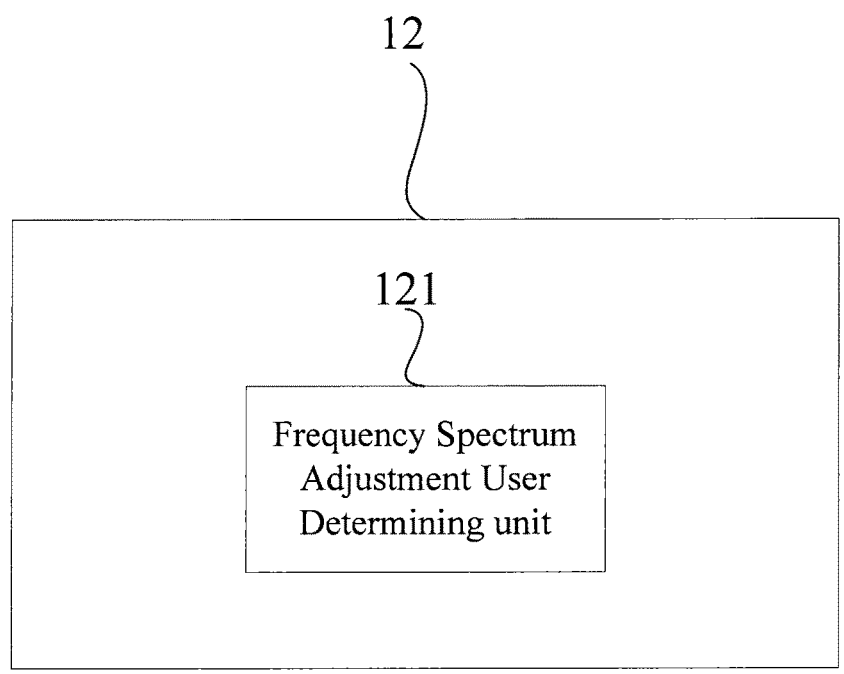
FIG. 2 is a schematic diagram schematically illustrating an implementation of a frequency spectrum adjustment determining device as shown in FIG. 1.

FIG. 2 is a schematic diagram schematically illustrating an implementation of a frequency spectrum adjustment determining device 12 as shown in FIG. 1.

As shown in FIG. 2, the frequency spectrum adjustment determining device 12 includes: a frequency spectrum adjustment user determining unit 121 configured for determining, according to the variation of the path loss information at the positions before and after the movement of respective secondary user groups, secondary user groups having a difference between the aggregation disturbances to the primary system before and after the movement larger than a first predetermined threshold, as secondary user groups whose usage of frequency spectrum needs to be adjusted, in the case where there are more than 1 secondary user group.

According to the disclosure, the frequency spectrum adjustment user determining unit 121 determines, according to the variation of the path loss information of respective secondary user groups, the aggregation disturbances to the primary system at the positions before and after the movement of respective secondary user groups. In the case where the cognitive radio system includes multiple secondary user groups, the aggregation disturbance refers to the disturbance of one secondary user group and the other secondary user groups together to the primary system. Typically, the variation of the disturbance of a secondary user group to the primary system before and after the movement may be determined by calculating the variation of the path loss of the secondary user group before and after the movement. Herein, the aggregation disturbance of respective secondary user groups together to the primary system is described by taking the cognitive radio system including three secondary user groups G1, G2 and G3 as an example. In this example, for convenience of explanation, it is assumed the transmitting power of the secondary user group G1 is the same as that of the secondary user group G2.

According to an embodiment of the present invention, the path loss value of the secondary user group before and after the movement may be the path loss value after the logarithmic operation and in the unit of dB.

For example, when the positions of the secondary user groups G1 and G2 change, according to the path loss database, the path loss value of the secondary user group G1 before the movement is 80 dB, the path loss value of the secondary user group G1 after the movement is 77 dB (the difference in the path loss values before and after the change is D1=77 dB−80 dB=−3 dB), the path loss value of the secondary user group G2 before the movement is 77 dB, the path loss value of the secondary user group G2 after the movement is 80 dB (the difference in the path loss values before and after the change is D2=80 dB−77 dB=3 dB), for example. This may be a case where the positions of the secondary user groups G1 and G2 are exchanged or a case where the movement of the secondary user groups G1 and G2 are irrelevant. Hence, as for a set including the secondary user groups G1 and G2, there is no difference in the path loss before and after the movement of the secondary user group G1 and G2 (D1+D2=−3 dB+3 dB=0 dB), thereby the frequency spectrum adjustment determining device 12 may determine that the difference in the aggregation disturbances at the positions before and after the movement of the secondary user groups G1 and G2 to the primary system is 0 dB (less than a first threshold). Therefore, the secondary user groups G1 and G2 may be determined as the secondary user groups whose usage of frequency spectrum does not need to be adjusted.

For the case where the transmitting powers of the secondary user groups are different, whether the usage of frequency spectrum of a secondary user group needs to be adjusted may be determined by calculating the vibration in the cumulative disturbance of the secondary user group to the primary user. The "equivalent transmitting power" of each secondary user group may be calculated according to the cumulative disturbance of all the secondary users in the secondary user group to the primary user and the path loss (mid-value) of the secondary user group.

More specifically, as for secondary user groups whose positions change, if the path loss of a part or all of the secondary user groups satisfies the following equation (2), it may be considered that the difference in the aggregation disturbances at the positions before and after the movement of the secondary user groups to the primary system is less than or equal to the first threshold. In this case, the frequency spectrum adjustment determining device 12 may determine the part or all of the secondary user groups as the secondary user groups whose usage of frequency spectrum does not need to be adjusted and determine the secondary user group which dose not satisfy with the following equation (2) as the secondary user group whose usage of frequency spectrum needs to be adjusted, $$\left| \sum_{i=1}^{n} 10^{-\frac{L_{1i}}{10}} - \sum_{i=1}^{n} 10^{-\frac{L_{2i}}{10}} \right| \leq T \qquad (2)$$

wherein, $L_{1i}$ denotes the path loss of the ith secondary user group at a position before the movement, $L_{2i}$ denotes the path loss of the ith secondary user group at a position after the movement, n is the number of the secondary user groups and T is a predetermined path loss difference.

The skilled in the art may understand that the predetermined path loss difference T may be set arbitrarily according to allowance limitation of the primary system to the secondary system.

In the above, the case where the secondary system includes multiple secondary user groups is described, but the present invention is not limited thereto. According to an embodiment of the disclosure, in the case that the secondary system has only one secondary user group, the frequency spectrum adjustment user determining unit 121 determines the secondary user group as the secondary user group whose usage of frequency spectrum needs to be adjusted if the secondary user group has a difference between path losses at the positions before and after the movement larger than the predetermined path loss difference.

Accordingly, in the case where only one secondary user group accesses, if the user group moves to an equivalent position of its path loss (i.e. the case where the difference between the path loss and the path loss before the movement of the user group is less than or equal to the predetermined path loss difference), the frequency spectrum adjustment user determining unit 121 determines the user group as the secondary user group whose usage of frequency spectrum dose not need to be adjusted. Otherwise, if the secondary user group has a difference between path losses at the positions before and after the movement larger than the predetermined loss difference, the frequency spectrum adjustment user determining unit 121 determines the user group as the secondary user group whose usage of frequency spectrum needs to be adjusted.

Figure 3:
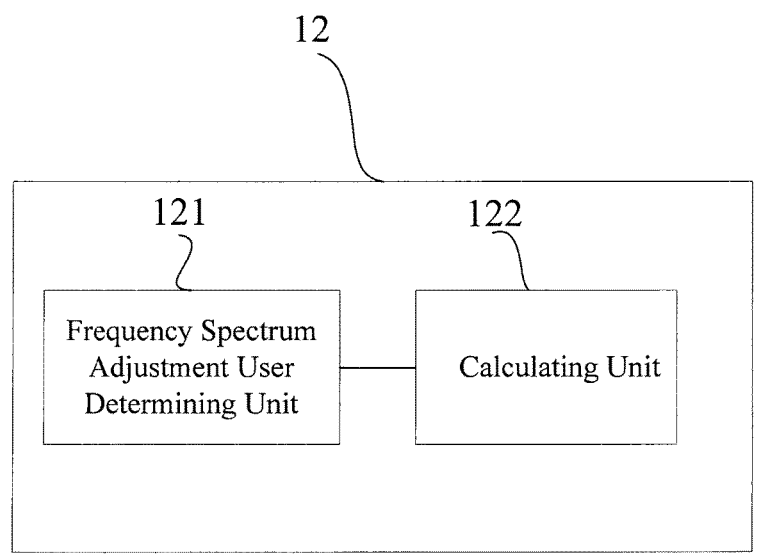
FIG. 3 is a schematic diagram schematically illustrating another implementation of the frequency spectrum adjustment determining device as shown in FIG. 1.

FIG. 3 is a schematic diagram schematically illustrating another implementation of the frequency spectrum adjustment determining device 12 as shown in FIG. 1.

Similar as the frequency spectrum adjustment determining device in FIG. 2, the frequency spectrum adjustment determining device 12 shown in FIG. 3 includes the frequency spectrum adjustment user determining unit 121. In addition, the frequency spectrum adjustment determining device 12 further includes a calculating unit 122 configured for calculating, with respect to at least one secondary user in the secondary user groups determined as those whose usage of frequency spectrum needs to be adjusted, the maximum transmission power that is tolerable for the primary system according to path loss information of each secondary user, so as to determine the adjustment to the transmission power of the secondary user according to the maximum transmission power calculated by the calculating unit.

The skilled in the art may be understand that any known method, such as the method described in the reference document (ECC Report 186, Technical and operational requirements for WSD under geo-location approach. 2013.1), may be used to calculate the maximum transmission power of the user that is tolerable for the primary system according to the path loss information, which is not repeated herein.

According to the disclosure, when the second user group is determined as the secondary user group whose usage of frequency spectrum needs to be adjusted, the calculating unit 122 may calculate, according to the path loss information of each secondary user in the secondary user group, the maximum transmission power of the secondary user that is tolerable for the primary system. In addition, preferably, the calculating unit 122 may only calculate the maximum transmission power of the secondary user in the secondary user group whose position is changed. Moreover, the calculating unit 122 may calculate the maximum transmission powers of all the secondary user in the user group, only when the disturbance of the secondary user group to the primary system exceeds the tolerance range of the primary system after the adjustment to the transmitting power of the secondary user whose position is changed.

According to a preferable embodiment of the disclosure, the calculating unit 122 may further be configured for calculating the maximum transmission power of the secondary users in the secondary user groups determined as those whose usage of frequency spectrum needs to be adjusted, based on priorities determined according to the position relationships between respective secondary users and the primary users. For example, it may be considered to preferably reduce the transmission power of the secondary user which is located closer to the primary system (e.g. the primary user in the primary system), so that the disturbance of the frequency spectrum usage of the secondary user in the secondary system to the primary system may be within the tolerance range of the primary system, only by adjusting the transmitting power of relatively less number of the secondary user. That is, during the calculation of the maximum transmission power of the secondary users whose positions are changed or all of the secondary users in the secondary user group, high priority may be given to a secondary user located closer to the primary user and low priority may be given to a secondary user located farther from the primary user, for example.

Each secondary user in the secondary user group may adjust the transmitting power of the secondary user itself according to the maximum transmission power calculated by the calculating unit 122, so as to ensure that the adjusted aggregation disturbance of the secondary user group to the primary system is within the tolerance range of the primary system.

According to an embodiment of the disclosure, the radio frequency spectrum management apparatus 1 may transmit the calculated maximum output power to the respective secondary users. The respective secondary users may determine whether to adjust their transmitting power according to the received maximum output power. For example, if the maximum transmitting power is less than the currently used transmitting power, the second user needs to adjust its transmitting power to be less than or equal to the maximum transmitting power; if the transmitting power currently used by the secondary user is less than the received maximum transmission power, the secondary user may do not adjust its transmitting power.

Figure 4:
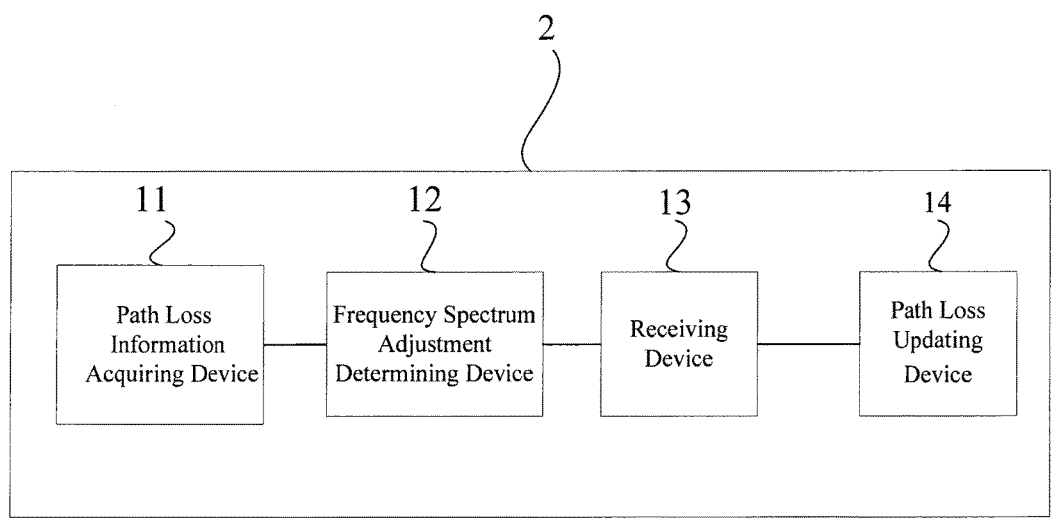
FIG. 4 is another exemplary structural block diagram schematically illustrating a radio frequency spectrum management apparatus according to an embodiment of the disclosure.

FIG. 4 is another exemplary structural block diagram schematically illustrating a radio frequency spectrum management apparatus according to an embodiment of the disclosure.

Similar as the frequency spectrum adjustment determining device 1 in FIG. 1, the radio frequency spectrum management apparatus 2 shown in FIG. 4 includes the path loss information acquiring device 11 and the frequency spectrum adjustment determining device 12. In addition, the radio frequency spectrum management apparatus 2 further includes a receiving device 13 configured for receiving from secondary users a signal including information of positions and information of transmitting powers; and a path loss updating device 14 configured for calculating a path loss at the position where the secondary user is located according to a receiving power of the signals received by the receiving device 13 and the information of transmitting powers included in the signal, and updating the path losses in the database according to the calculated path loss.

Furthermore, according to an embodiment of the disclosure, the receiving device of the radio frequency spectrum management apparatus 2 may transmit a test signal and determine the path loss at the position after the movement of the secondary user, according to the power of the transmitted test signal and the power of the test signal received by the secondary user after the movement, so as to update the path loss information at the position in the path loss database. This is particularly applicable to the case where a wireless communication environment is likely to change.

Typically, a wireless communication environment is similar within a certain range. Hence, the updated path loss information may further be used to estimate and update the path loss at other positions near the position.

Therefore, according to a preferable embodiment of the disclosure, the path loss updating device 14 is further configured for estimating path losses at positions near the position having updated path loss based on the updated path loss, and updating the path losses in the database by using the estimated path loss.

According to an embodiment of the disclosure, the path loss updating device 14 is configured to take the position having updated path loss information as an updated reference point and estimate the path loss at other positions by using the path loss at the updated reference point and the distance between other positions and the updated reference point.

More specifically, for example, the path losses at other positions may be estimated by using the linear interpolation. That is, two positions having updated path loss information are given to weights according to distances, to estimate the path losses at other positions. In this way, a lot of path loss information may be obtained by only a small number of actual measurements.

For example, when it is known that the positions P1 and P2 have update losses, i.e. x and y, respectively. Assuming that the distance between the two points P1 and P2 is for example 3m, one point is set every 1 m along the line formed by the points P1 and P2, thereby the unknown points P3 and P4 are set. In this case, the path loss values of two unknown points P3 and P4 may be estimated to be 2x/3+y/3, x/3+2y/3, respectively.

The above-mentioned method to estimate the path loss at other location by using the linear interpolation according to the updated path loss is only exemplary, and the invention is not limited thereto. The skilled in the art may understand that the path loss may be estimated by using other estimating method known in the art.

When the position of the secondary user group is changed, the path losses of the secondary user apparatuses at different locations may be tested, estimated and updated in a timely manner. Therefore, it is possible to acquire the available frequency spectrum information, for example but not limited to, the maximum transmitting power, of the secondary user apparatus with higher accuracy.

Furthermore, those skilled in the art may understand that the receiving device 13 as shown in FIG. 4 may also be configured for transmitting the maximum transmission power calculated by the calculating unit 12 to the secondary user apparatus.

Corresponding to the radio frequency spectrum management apparatus according to the embodiment of the disclosure, the disclosure further provides a radio frequency spectrum management method for a cognitive radio system including primary systems and secondary systems.

Figure 5:
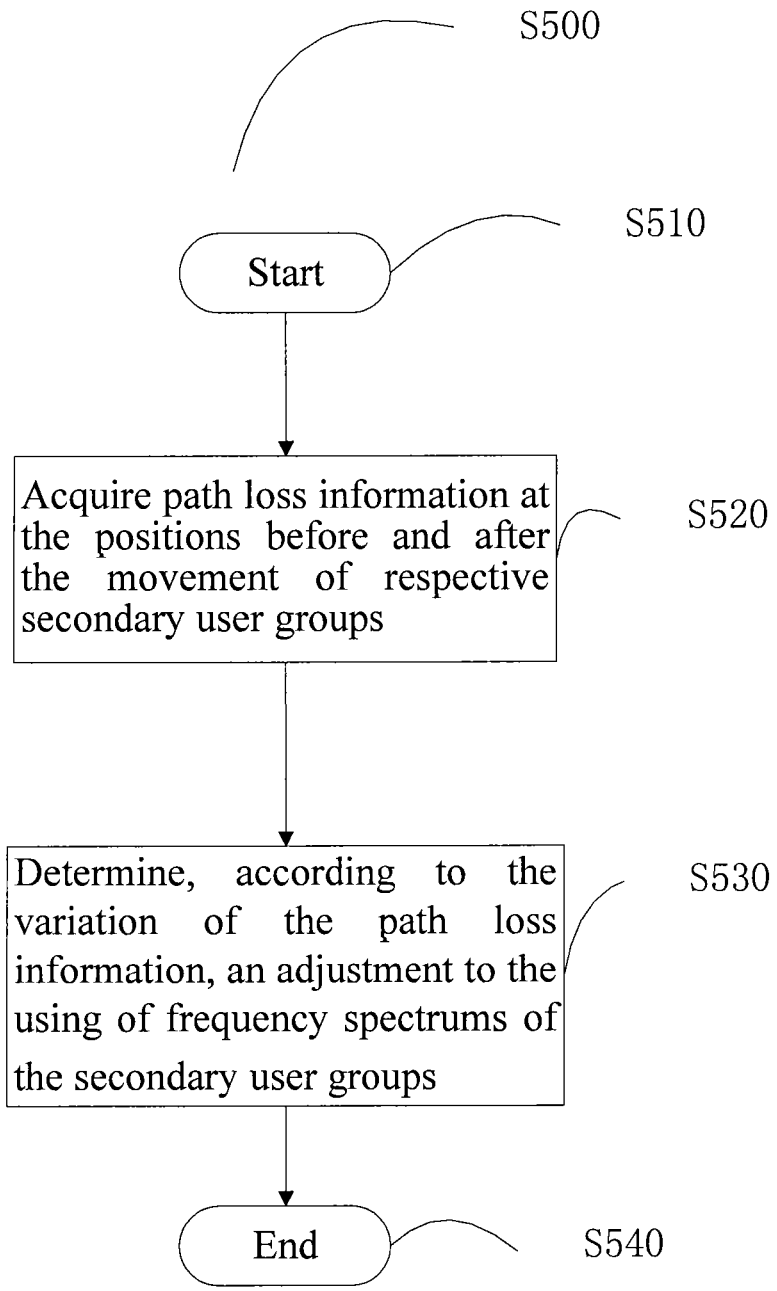
FIG. 5 is a flowchart schematically illustrating a frequency spectrum resource management method according to an embodiment of the disclosure.

FIG. 5 is a schematic flowchart illustrating a radio frequency spectrum management method according to an embodiment of the disclosure.

As shown in FIG. 5, the flowchart 500 of the radio frequency spectrum management method according to the embodiment of the disclosure starts in S510 and then executes the process in S520.

In S520, path loss information at the positions before and after the movement of respective secondary user groups is respectively acquired according to position variation information of respective secondary user groups in the secondary systems, wherein, the secondary user group includes one or more secondary users. For example, S520 may be implemented by executing, for example, the process of the path loss information acquiring device 11 described with reference to FIG. 1, and the description thereof is omitted herein. Then, S530 is executed.

In S530, an adjustment to the usage of frequency spectrums of the secondary user groups is determined according to the variation of the path loss information at the positions before and after the movement of respective secondary user groups. For example, S530 may be implemented by executing, for example, the process of the frequency spectrum adjustment determining device 12 described with reference to FIGS. 2 to 3, and the description thereof is omitted herein.

The flowchart 500 ends in S540.

Preferably, in Step S520, path loss information at the positions before and after the movement of respective secondary user groups may be respectively acquired, according to position variation information of respective secondary user groups, from a predetermined path loss database.

According to a preferable embodiment of the disclosure, at Step S530, secondary user groups having a difference between the aggregation disturbances to the primary system before and after the movement larger than a first predetermined threshold may be determined, according to the path loss information at the positions before and after the movement of respective secondary user groups, as secondary user groups whose usage of frequency spectrum needs to be adjusted. For example, the determination of an adjustment to usage of frequency spectrums of the secondary systems may be implemented by executing, for example, the process of the frequency spectrum adjustment user determining unit 121 described with reference to FIG. 2, and the description thereof is omitted herein.

Furthermore, in the case that the secondary system has only one secondary user group, at Step S530, the secondary user group may be determined as the secondary user group whose usage of frequency spectrum needs to be adjusted if the secondary user group has a difference between path losses at the positions before and after the movement of the secondary user group larger than the predetermined path loss difference.

According to another embodiment of the disclosure, Step 530 may further includes: calculating, with respect to at least one secondary user in the secondary user groups determined as those whose usage of frequency spectrum needs to be adjusted, the maximum transmission power of each secondary user that is tolerable for the primary system according to path loss information of the secondary user, so as to determine the adjustment to the transmission power of the secondary user according to the maximum transmission power.

According to a preferable embodiment of the disclosure, at Step 530, the maximum transmission power of the secondary users in the secondary user groups determined as those whose usage of frequency spectrum needs to be adjusted may also be calculated, based on priorities determined according to the position relationships between respective secondary users and the primary users. For example, the calculation of the maximum transmission power of at least one secondary user in the secondary user groups may be implemented by executing, for example, the process of the calculating unit 122 described with reference to FIG. 3, and the description thereof is omitted herein.

Furthermore, the radio frequency spectrum management method according to the disclosure further includes: transmitting a test signal, calculating the path loss at the position after the movement of the secondary user, according to the power of the transmitted test signal and the power of the test signal received by the secondary user in the secondary user group after the movement, and updating the path loss database according to the calculated path loss. For example, the step of transmitting a test signal and the step of updating the path loss may be implemented by executing, for example, the process of the receiving device and the path loss updating device 14 with reference to FIG. 4, and the description thereof is omitted herein.

According to an embodiment of the disclosure, there is further provided a secondary user apparatus corresponding to the radio frequency spectrum management apparatus according to the embodiment of the invention.

Figure 6A:
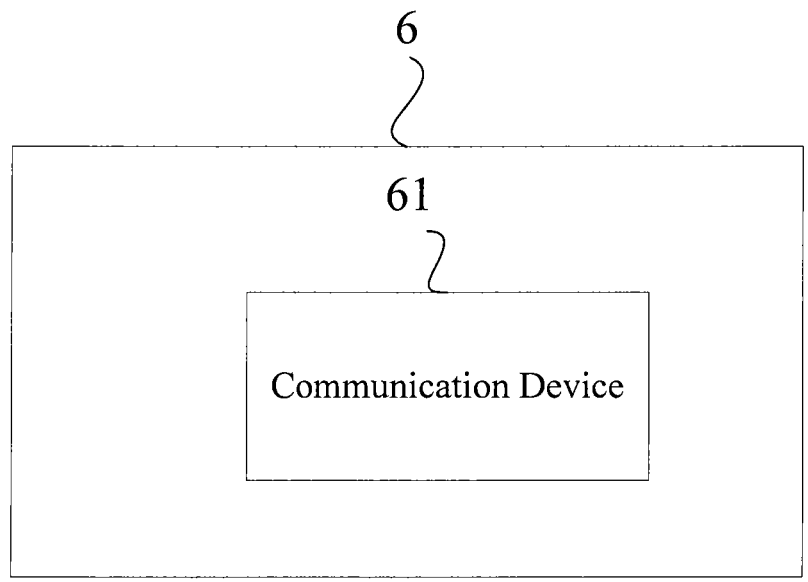
FIG. 6a is an exemplary structural block diagram schematically illustrating a secondary user apparatus according to an embodiment of the disclosure.

FIG. 6a illustrates exemplary structural block diagram of a secondary user apparatus according to an embodiment of the disclosure.

As shown in FIG. 6a, the secondary user apparatus 6 according to an embodiment of the disclosure includes a communication device 61 configured for receiving frequency spectrum adjusting information determined based on path loss information of the secondary user apparatus, wherein, the secondary user apparatus performs an adjustment to its usage of the frequency spectrum based on the frequency spectrum adjusting information, so that the adjusted usage of frequency spectrum of the secondary user apparatus satisfies with the disturbance tolerance of primary systems.

For example, the secondary user apparatus may receive the frequency spectrum adjusting information (including but not limited to the information of the maximum transmitting power described with reference to FIG. 3, for example) from the above-mentioned radio frequency spectrum management apparatus described with reference FIGS. 1 to 4 and adjust the usage of frequency spectrums of the individual secondary users according to the information of adjustment of the frequency spectrums. For example, the secondary user apparatus according to the embodiment of the discloser may be each secondary user in the secondary user groups of which the adjustment to the usage of frequency spectrums is determined by the radio frequency spectrum management apparatus described with reference to FIGS. 1 to 4.

According to an embodiment of the disclosure, the communication device 61 is further configured for transmitting to a radio frequency spectrum management apparatus a signal including position information of the secondary user apparatus and information of transmitting power, so that the radio frequency spectrum management apparatus receives the signal and calculates path loss information at the position. For the description for receiving the signal and calculating the path loss information by the radio frequency spectrum management apparatus, the operation of the receiving device 13 and the path loss updating device 14 of the radio frequency spectrum management apparatus 1 described with reference to FIG. 4 may be referred to, for example.

According to another embodiment of the disclosure, the secondary user apparatus may calculate the path loss of the position where the secondary user apparatus itself is located.

Figure 6B:
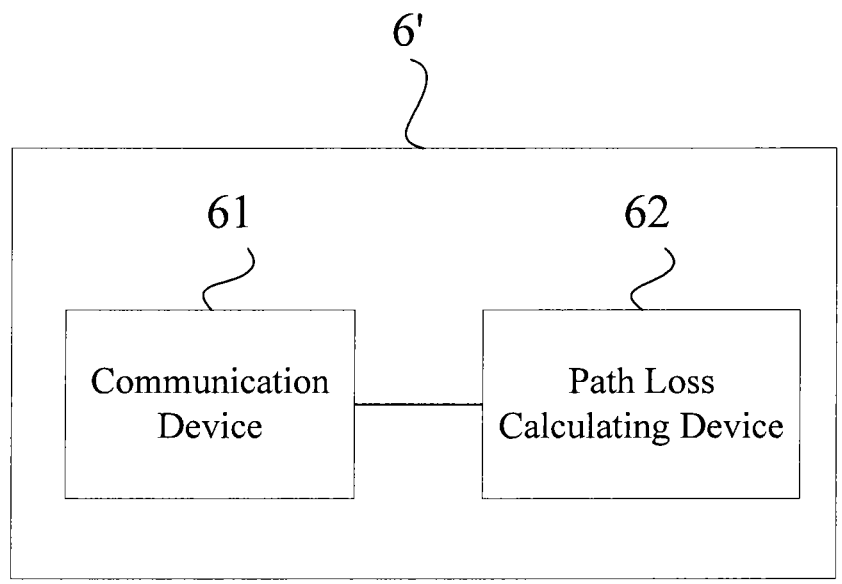
FIG. 6b is another exemplary structural block diagram schematically illustrating a secondary user apparatus according to an embodiment of the disclosure.

FIG. 6b illustrates another exemplary structural block diagram of a secondary user apparatus according to an embodiment of the disclosure As shown in FIG. 6b, the secondary user apparatus 6' includes a communication device 61 configured for receiving frequency spectrum adjusting information determined based on path loss information of the secondary user apparatus and receiving a signal including information of transmitting power transmitted from a radio frequency spectrum management apparatus; and a path loss calculating device 62 configured for calculating path loss information of the position where the secondary user apparatus is located according to receiving power for receiving the signal and the information of transmitting power, and the communication device 61 transmits the path loss information of the position to the radio frequency spectrum management apparatus.

According to an embodiment of the disclosure, the radio frequency spectrum management apparatus is further configured for planning the target position of the movement of the secondary user according to the path loss information stored in the path loss database, for example.

Figure 7:
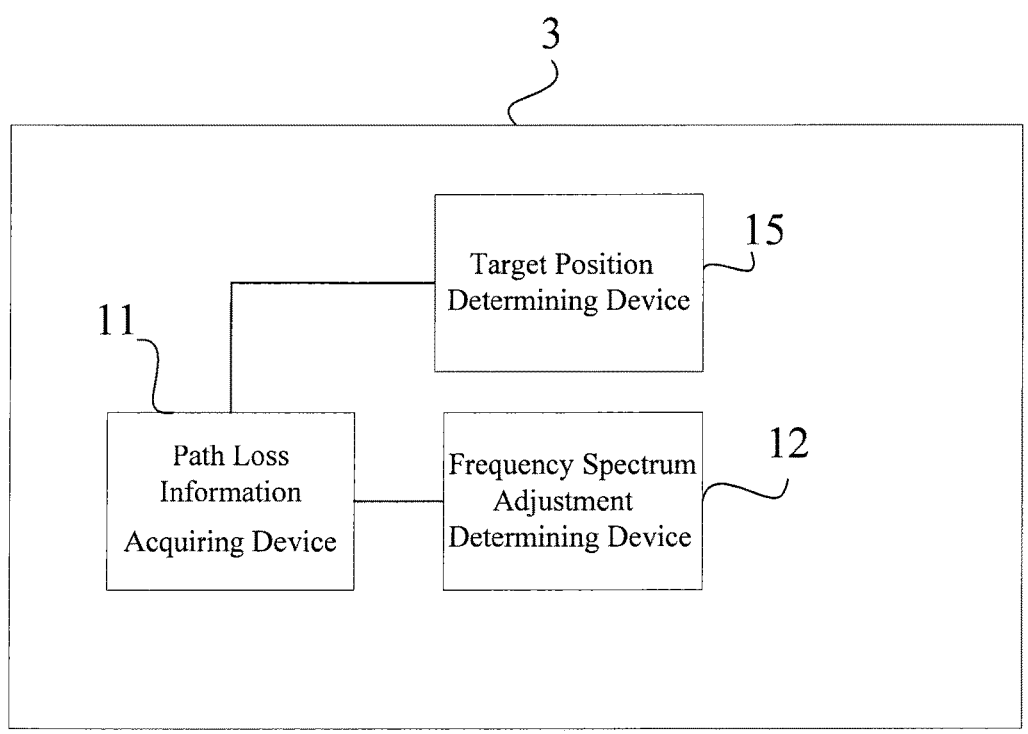
FIG. 7 is another exemplary structural block diagram schematically illustrating a radio frequency spectrum management apparatus according to an embodiment of the disclosure.

FIG. 7 is another exemplary structural block diagram schematically illustrating a radio frequency spectrum management apparatus according to an embodiment of the disclosure.

Similar as the frequency spectrum adjustment determining device 1 in FIG. 1, the radio frequency spectrum management apparatus 3 shown in FIG. 7 includes the path loss information acquiring device 11 and the frequency spectrum adjustment determining device 12. In addition, the radio frequency spectrum management apparatus 3 further includes a target position determining device 15 configured for determining the movement target position of the secondary user apparatus based on the path loss information, so that the usage of frequency spectrum after the secondary user apparatus moves to the movement target position satisfies with the disturbance tolerance of the primary systems.

According to an embodiment of the invention, the path loss information acquiring device 11 is further configured for acquiring path loss information of a predetermined range of a movement destination for the secondary user apparatus according to the movement destination. The target position determining device 15 may be configured for determining positions within the predetermined range and having such a path loss that the difference between the path loss and the path loss at the position where the secondary user apparatus is located is smaller than a second threshold, as the movement target position of the secondary user apparatus, according to the path loss information and the movement destination position for the secondary user.

Specifically, for example, the secondary user group located at a first position may transmit, a second position where the secondary user group plans to move, to the radio frequency spectrum management apparatus before moving. The radio frequency spectrum management apparatus may find according to the second position that the difference between the path loss at the second position and the path loss at the first position is relatively large and hence the resources need to be reallocated, by querying the path loss database. In this case, the radio frequency spectrum management apparatus queries from the path loss database a third position near the second position and having a path loss similar to the path loss at the first position and transmits the information of the third position to the secondary user group to suggest the secondary user group to move to the third position.

According to another embodiment of the invention, as for the case where the disturbance tolerance of the primary systems is not satisfied and the reallocation should be performed after the secondary user group moves to the second position, the radio frequency spectrum management apparatus is configured for querying the path loss database to obtain a third position near the second position and having a path loss similar to the path loss at the first position and transmits the information of the reconfiguration and the third position to the secondary users for them to choose to move or reallocate.

Furthermore, those skilled in the art may understand that the radio frequency spectrum apparatus 3 in FIG. 7 may also be provided with a receiving device and a path loss updating device as the case of the radio frequency spectrum apparatus 2 in FIG. 4.

Correspondingly, the secondary user apparatus may also plan the movement path according to the path loss information stored in the path loss database, for example.

Figure 8:
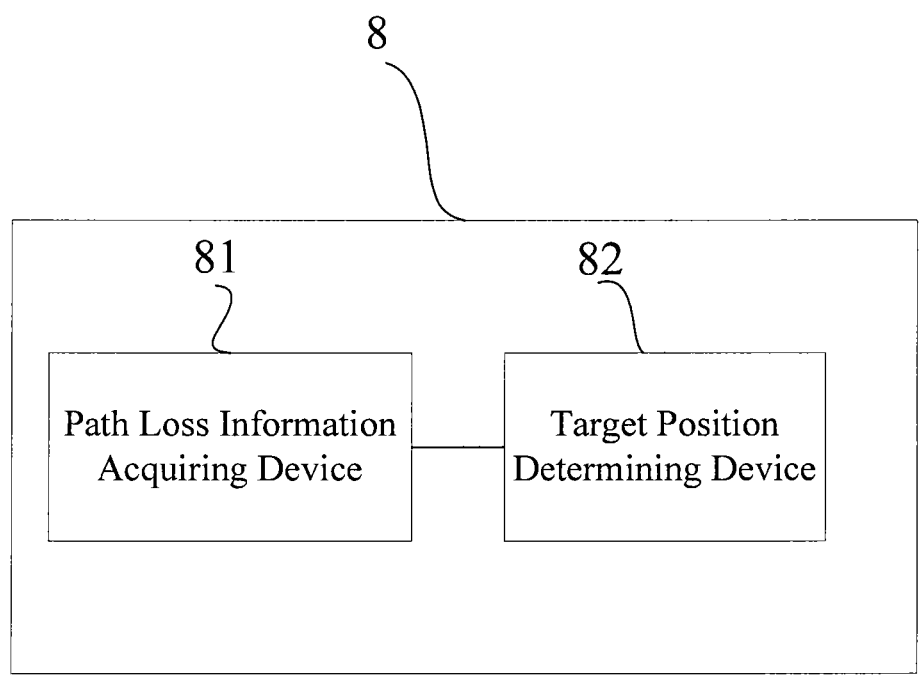
FIG. 8 is an exemplary structural block diagram schematically illustrating a secondary user apparatus according to another embodiment of the disclosure.

FIG. 8 is another exemplary structural block diagram schematically illustrating a secondary user apparatus according to an embodiment of the disclosure.

As show in FIG. 8, the secondary user apparatus 8 according to the embodiment of the disclosure includes a path loss information acquiring device 81 configured for acquiring path loss information of a predetermined range of a movement destination for the secondary user apparatus according to the movement destination; and a target position determining device 82 configured for determining the movement target position of the secondary user apparatus based on the path loss information, so that the usage of frequency spectrum after the secondary user apparatus moves to the movement target position satisfies with the disturbance tolerance of the primary systems.

According to an preferable embodiment of the disclosure, the target position determining device 82 is configured for determining positions within the predetermined range and having such a path loss that the difference between the path loss and a path loss at the position where the secondary user apparatus is within a predetermined threshold range, as the movement target position of the secondary user apparatus, according to the path loss information of the predetermined range of the movement destination for the secondary user apparatus.

The secondary user apparatus can find an equivalent position according to the path loss information for planning the movement path, thereby reducing the number of times of reconfiguration of the usage of the frequency spectrums due to the movement of the secondary user apparatus.

According to an embodiment of the disclosure, there is further provided a radio frequency spectrum management system for a cognitive radio system including primary systems and secondary systems.

Figure 9:
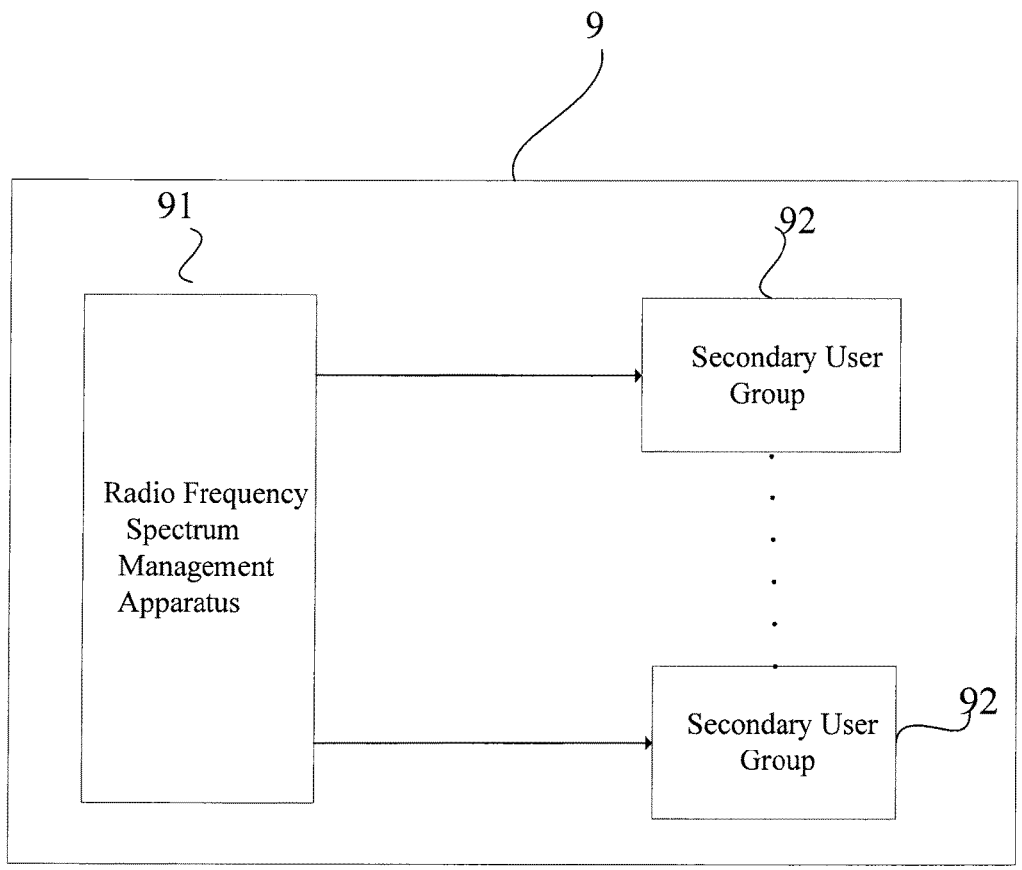
FIG. 9 is a schematic structural block diagram illustrating a radio frequency spectrum management system according to an embodiment of the disclosure.

FIG. 9 is a schematic structural block diagram illustrating a radio frequency spectrum management system according to an embodiment of the disclosure.

As shown in FIG. 9, the radio frequency spectrum management system 9 includes a radio frequency spectrum management apparatus 91 and one or more secondary user groups 92.

The radio frequency spectrum management apparatus 91 includes: a path loss information acquiring device configured for acquiring, according to position variation information of respective secondary user groups in the secondary systems, path loss information at the positions before and after the movement of respective secondary user groups respectively, wherein, the secondary user group includes one or more secondary users; and a frequency spectrum adjustment determining device configured for determining an adjustment to the usage of frequency spectrums of the secondary user groups, according to the variation of the path loss information at the positions before and after the movement, and determining secondary user groups whose usage of frequency spectrum needs to be adjusted. According to the embodiment of the disclosure, the radio frequency spectrum management apparatus 91 is corresponding to the radio frequency spectrum management apparatus 1 described with reference to FIGS. 1 to 4, for example. According to the embodiment of the disclosure, the radio frequency spectrum management apparatus 91 is further configured for transmitting available frequency spectrum information related to secondary user groups determined as those whose usage of frequency spectrum needs to be adjusted;

Each secondary user apparatus of the secondary user group 92 includes a communication device configured for receiving the available frequency spectrum information transmitted from the radio frequency spectrum management apparatus 91, and the secondary user apparatus performs an adjustment to its usage of frequency spectrum based on the available frequency spectrum information, so that the adjusted usage of the frequency spectrum of the secondary user apparatus satisfies with the disturbance tolerance of the primary systems.

The radio frequency spectrum management apparatus is described as an apparatus provided independently from the secondary user apparatus in the above, such as, an apparatus provided in a secondary base station of a secondary system or an apparatus provided independently from a secondary system. However, the disclosure is not limited thereto. The radio frequency spectrum management apparatus may also be provided in a secondary user apparatus. In this case, the radio frequency spectrum management apparatuses provided in multiple secondary systems may manage the resources of the secondary systems by performing distributed control.

Compared with the prior art, the above-mentioned radio frequency spectrum management apparatus, method, system and secondary user apparatus according to the embodiments of the disclosure can achieve at least one of the following advantageous effects. During the adjustment to the frequency spectrum resources, not all of the usage of the frequency spectrum by the secondary users has to be adjusted, so that the adjustment efficiency of the frequency spectrum resources may be improved and the system overhead may be reduced. Moreover, the path loss database may be generated and updated in a real time manner, so that the accuracy in the adjustment to the usage of the frequency spectrum by the secondary user apparatuses may be improved.

Application Examples

The radio frequency spectrum management apparatus, method, system and secondary user apparatus according to the embodiments of the disclosure is particularly suitable for the case where vehicle communication is the secondary user. The vehicles on the road perform reciprocating movement and their movement trajectories are relatively determined, and the positions of part of the secondary user groups may exchanged when a large number of secondary user groups are accessed, the radio frequency spectrum management apparatus, method, system and secondary user apparatus according to the disclosure may reduce the number of times of reconfiguration. There are different degrees of reducing for different movement modes (such as the highway mobility mode and the Manhattan mobility mode). For example, in the case of the rail or road traffic environment, a large number of users regularly perform the reciprocating movement on the fixed road, hence the number of times of reconfiguration may be reduced significantly.

The radio frequency spectrum management apparatus, method, system and secondary user apparatus according to the embodiments of the disclosure are also applicable to dwelling house environment and cell environment. In the case where a large number of cognitive users access and the range of movement of individual user is relatively small, that is, the individual user moves inside the cell, each cell can be regarded as a cognitive user group for easy identification and calculation.

Each of the modules or units in the above-mentioned devices may be configured by using software, firmware, hardware or any combination thereof. Specific means or methods that may be used for configuring is well-known by the skilled in the art and are not discussed herein. In the case of using the software or firmware, a program constituting the software is installed from a storage medium or a network to a computer having a dedicated hardware configuration, and the computer can execute various functions and so on when being installed with various programs.

In the case where the above-mentioned series of processing are implemented by using the software, a program constituting the software is installed from a network such as the Internet or storage media such as removable media.

The skilled in the art should understand that the above-mentioned storage medium is not limited to the removable media which stores a program therein and is distributed separately from the apparatus to provide the program to the user. Examples of the removable media include a disk (including floppy (registered trademark)), a compact disc (including compact disc read-only memory (CD-ROM) and digital versatile disc (DVD)), a magneto-optical disk (including mini disc (MD) (registered trademark)) and a semiconductor memory. Alternatively, the storage medium may be a ROM, a hard disk included in the storage section and so on, which stores the program therein and is distributed to the user together with the apparatus containing the storage medium.

The disclosure further provides a program product having machine-readable command code stored thereon. When the command code is red and executed by the machine, the above-motioned method according to the embodiments of the disclosure may be performed.

Additionally, the present technology may also be configured as below.

(1) radio frequency spectrum management apparatus for a cognitive radio system comprising primary systems and secondary systems, the radio frequency spectrum management apparatus comprising:

a path loss information acquiring device configured for acquiring, according to position variation information of respective secondary user groups in the secondary systems, path loss information at the positions before and after the movement of respective secondary user groups respectively, wherein, the secondary user group comprises one or more secondary users; and a frequency spectrum adjustment determining device configured for determining an adjustment to the usage of frequency spectrums of the secondary user groups, according to the variation of the path loss information at the positions before and after the movement of respective secondary user groups.

(2). The radio frequency spectrum management apparatus according to (1), wherein, the path loss information acquiring device is configured for acquiring, according to position variation information of respective secondary user groups, path loss information at the positions before and after the movement of respective secondary user groups respectively from a predetermined path loss database.

(3). The radio frequency spectrum management apparatus according to (1) or (2), wherein the frequency spectrum adjustment determining device comprises:

a frequency spectrum adjustment user determining unit configured for determining, according to the variation of the path loss information at the positions before and after the movement of respective secondary user groups, secondary user groups having a difference between the aggregation disturbances to the primary system before and after the movement larger than a first predetermined threshold, as secondary user groups whose usage of frequency spectrum needs to be adjusted.

(4). The radio frequency spectrum management apparatus according to any of (1)-(3), wherein, the secondary user groups are divided in terms of distances between respective secondary users and a predetermined reference point and/or path loss similarities.

(5). The radio frequency spectrum management apparatus according to (4), wherein, the frequency spectrum adjustment determining device further comprises:

a calculating unit configured for calculating, with respect to at least one secondary user in the secondary user groups determined as those whose usage of frequency spectrum needs to be adjusted, the maximum transmission power of each secondary user that is tolerable for the primary system according to path loss information of the secondary user, so as to determine the adjustment to the transmission power of the secondary user according to the maximum transmission power.

(6). The radio frequency spectrum management apparatus according to (5), wherein, the calculating unit is configured for calculating the maximum transmission power of the secondary users in the secondary user groups determined as those whose usage of frequency spectrum needs to be adjusted, based on priorities determined according to the position relationships between respective secondary users and the primary users.

(7). The radio frequency spectrum management apparatus according to any of (3)-(6), wherein, the frequency spectrum adjustment user determining unit is further configured for determining, in the case that the secondary system has only one secondary user group, a secondary user group as the secondary user group whose usage of frequency spectrum needs to be adjusted if the secondary user group has a difference between path losses at the positions before and after the movement larger than a predetermined path loss difference.

(8). The radio frequency spectrum management apparatus according to (2), wherein the radio frequency spectrum management apparatus further comprises:

a receiving device configured for receiving from secondary users signals including information of positions and information of transmitting powers; and a path loss updating device configured for calculating a path loss at the position where the secondary user is located according to a receiving power of the signals received by the receiving device and the information of transmitting powers included in the signal, and updating the path losses in the database according to the calculated path loss.

(9). The radio frequency spectrum management apparatus according to (8), wherein the path loss updating device is further configured for estimating path losses at positions near the position having updated path loss based on the updated path loss, and updating the path losses in the database by using the estimated path loss.

(10). The radio frequency spectrum management apparatus according to any of (1)-(9), wherein, the path loss information acquiring device is further configured for acquiring path loss information of a predetermined range of a movement destination for the secondary user according to the movement destination, the radio frequency spectrum management apparatus further comprises a target position determining device configured for determining the movement target position of the secondary user based on path loss information of a predetermined range of the movement destination, so that the usage of frequency spectrum after the secondary users move to the movement target position satisfies with the disturbance tolerance of the primary systems.

(11). A secondary user apparatus, comprising:
a communication device configured for receiving frequency spectrum adjusting information determined based on path loss information of the secondary user apparatus,
wherein, the secondary user apparatus performs an adjustment to its usage of the frequency spectrum based on the frequency spectrum adjusting information, so that the adjusted usage of frequency spectrum of the secondary user apparatus satisfies with the disturbance tolerance of primary systems.

(12). The secondary user apparatus according to (11), wherein, the communication device is further configured for receiving a signal including information of transmitting power transmitted from a radio frequency spectrum management apparatus, the secondary user apparatus further comprises a path loss calculating device configured for calculating path loss information of the position where the secondary user apparatus is located according to receiving power for receiving the signal and the information of transmitting power, and the communication device transmits the path loss information of the position to the radio frequency spectrum management apparatus.

(13). The secondary user apparatus according to (11), wherein, the communication device is further configured for transmitting to a radio frequency spectrum management apparatus a signal including position information of the secondary user apparatus and information of transmitting power, so that the radio frequency spectrum management apparatus receives the signal and calculates path loss information at the position where the secondary user apparatus is located.

(14). A radio frequency spectrum management method for a cognitive radio system comprising primary systems and secondary systems, the radio frequency spectrum management method comprising steps of:
acquiring, according to position variation information of respective secondary user groups in the secondary systems, path loss information at the positions before and after the movement of respective secondary user groups respectively, wherein, the secondary user group comprises one or more secondary users; and
determining an adjustment to the usage of frequency spectrums of the secondary user groups, according to the variation of the path loss information at the positions before and after the movement of respective secondary user groups.

(15). The radio frequency spectrum management method according to (14), wherein, the step of acquiring path loss information comprises acquiring, according to position variation information of respective secondary user groups, path loss information at the positions before and after the movement of the respective secondary user groups respectively from a predetermined path loss database.

(16). The radio frequency spectrum management method according to (14) or (15), wherein the step of determining an adjustment to the usage of frequency spectrums of the secondary systems comprises: determining, according to the variation of the path loss information at the positions before and after the movement of respective secondary user groups, secondary user groups having a difference between the aggregation disturbances to the primary system before and after the movement larger than a first predetermined threshold, as secondary user groups whose usage of frequency spectrum needs to be adjusted.

(17). The radio frequency spectrum management method according to (16), wherein the step of determining an adjustment to the usage of frequency spectrums of the secondary systems further comprises: calculating, with respect to at least one secondary user in the secondary user groups determined as those whose usage of frequency spectrum needs to be adjusted, the maximum transmission power of each secondary user that is tolerable for the primary system according to path loss information of the secondary user, so as to determine the adjustment to the transmission power of the secondary user according to the maximum transmission power.

(18). The radio frequency spectrum management method according to (16) or (17), wherein the step of determining an adjustment to the usage of frequency spectrums of the secondary systems further comprises: determining, in the case that the secondary system has only one secondary user group, the secondary user group as the secondary user group whose usage of frequency spectrum needs to be adjusted if the secondary user group has a difference between path losses at the positions before and after the movement larger than a predetermined path loss difference.

(19). A secondary user apparatus, comprising:
a path loss information acquiring device configured for acquiring path loss information of a predetermined range of a movement destination for the secondary user apparatus according to the movement destination; and
a target position determining device configured for determining the movement target position of the secondary user apparatus based on the path loss information, so that the usage of frequency spectrum after the secondary user apparatus moves to the movement target position satisfies with the disturbance tolerance of primary systems.

(20). The secondary user apparatus according to (19), wherein, the target position determining device is further configured for determining positions within the predetermined range and having such a path loss that the difference between the path loss and the path loss at the position where the secondary user apparatus is located is smaller than a second predetermined threshold, as the movement target position of the secondary user apparatus, according to the path loss information.

(21). A radio frequency spectrum management system for a cognitive radio system comprises primary systems and secondary systems, the radio frequency spectrum management system comprising a radio frequency spectrum management apparatus and one or more secondary user groups, wherein,
the radio frequency spectrum management apparatus comprises:
a path loss information acquiring device configured for acquiring, according to position variation information of respective secondary user groups in the secondary systems, path loss information at the positions before and after the movement of respective secondary user groups respectively, wherein, the secondary user group comprises one or more secondary users; and
a frequency spectrum adjustment determining device configured for determining an adjustment to the usage of frequency spectrums of the secondary user groups, according to the variation of the path loss information at the positions before and after the movement of respective secondary user groups, including determining secondary user groups whose usage of frequency spectrum needs to be adjusted;
the radio frequency spectrum management apparatus is further configured for transmitting available frequency spectrum information related to secondary user groups determined as those whose usage of frequency spectrum needs to be adjusted;

each secondary user apparatus of the secondary user group comprises a communication device configured for receiving the available frequency spectrum information, and the secondary user apparatus performs an adjustment to its usage of frequency spectrum based on the available frequency spectrum information, so that the adjusted usage of the frequency spectrum of the secondary user apparatus satisfies with the disturbance tolerance of the primary systems.

In the above description of the embodiments of the present invention, a feature described and/or illustrated for one embodiment may be used in a same or similar way in one or more other embodiments, or may be used in combination with a feature in other embodiment, or alternate a feature of other embodiment.

In the above-mentioned embodiments and examples, the reference numerals are used to represent each of the steps and/or units. The skilled in the art should understand that these reference numerals are only used for convenience in the description and the drawings and do not mean to define the order and so on.

Furthermore, in the disclosure, the relationship terminologies such as left and right, first and second and the like are only used herein to distinguish an entity or operation from another entity or operation, and it is not necessarily required or implied that there are any actual relationship or order of this kind between those entities and operations. Moreover, the terminologies of 'comprise', 'include' and any other variants are intended to cover the non-exclusive contains so that the processes, methods, articles or equipment including a series of elements not only include those elements but also include other elements that are not listed definitely or also include the elements inherent in the processes, methods, articles or equipment. In the case of no more restrictions, the elements defined by the statement 'include one . . . ' do not exclude that other same elements also exist in the processes, methods, articles or equipment including the elements.

Finally, it should be noted that the method according to the present invention is not limited to be executed in the time order described in the specification, but may also be executed sequentially, in parallel or independently in other time order. Therefore, the order of execution of the method described in the specification does not limit the technical scope of the invention.

Although the invention is disclosed in the description of the embodiments of the invention in above, it should be understood that all of the above-mentioned embodiments and examples are illustrative and are not restrictive. Various modifications, improvement or equivalents of the invention may be designed by the skilled in the art within the spirit and scope of the appended claims. These modifications, improvement or equivalents should also be considered to be within the scope of protection of the invention.

The invention claimed is:

1. A radio frequency spectrum management apparatus for a cognitive radio system comprising primary systems and secondary systems, the radio frequency spectrum management apparatus comprising:

circuitry, configured to acquire, according to position variation information of respective secondary user groups in the secondary systems, path loss information at positions before and after a movement of the respective secondary user groups respectively, wherein, at least one of the secondary user groups comprises a plurality of secondary users, and the secondary users are grouped into the secondary user groups by dividing the secondary users in terms of at least one of distances between the respective secondary users and a reference secondary user and path loss similarities with path loss of the reference secondary user by dividing at least one of the distances and the path loss similarities using at least a threshold; and determine an adjustment to a usage of frequency spectrums of the secondary user groups, according to a variation of the path loss information at the positions before and after the movement of the respective secondary user groups, wherein a secondary user whose path loss is closest to a mid-value of a certain path loss interval is selected as the reference secondary user.

2. The radio frequency spectrum management apparatus according to claim 1, wherein, the circuitry is further configured to acquire, according to the position variation information of the respective secondary user groups, the path loss information at the positions before and after the movement of the respective secondary user groups respectively from a predetermined path loss database.

3. The radio frequency spectrum management apparatus according to claim 1, wherein the circuitry is further configured to determine, according to the variation of the path loss information at the positions before and after the movement of the respective secondary user groups, secondary user groups having a difference between aggregation disturbances to the primary system before and after the movement larger than a first predetermined threshold, as the secondary user groups whose usage of frequency spectrum needs to be adjusted.

4. The radio frequency spectrum management apparatus according to claim 1, wherein, the circuitry is further configured to calculate, with respect to at least one of the secondary users in the secondary user groups determined as those whose usage of frequency spectrum needs to be adjusted, the maximum transmission power of each secondary user that is tolerable for the primary system according to path loss information of the secondary user, so as to determine the adjustment to the transmission power of the secondary user according to the maximum transmission power.

5. The radio frequency spectrum management apparatus according to claim 4, wherein, the circuitry is further configured to calculate the maximum transmission power of the secondary users in the secondary user groups determined as those whose usage of frequency spectrum needs to be adjusted, based on priorities determined according to position relationships between respective secondary users and the primary users.

6. The radio frequency spectrum management apparatus according to claim 3, wherein, the circuitry is further configured to determine, in a case that the secondary system has only one secondary user group, a secondary user group as the secondary user group whose usage of frequency spectrum needs to be adjusted when the secondary user group has a difference between path losses at the positions before and after the movement larger than a predetermined path loss difference.

7. The radio frequency spectrum management apparatus according to claim 2, wherein the circuitry is further configured to:

receive from the secondary users signals including information of positions and information of transmitting powers;

calculate a path loss at a position where the secondary user is located according to a receiving power of the signals received by the circuitry and the information of transmitting powers included in the signals; and update the path losses in the database according to the calculated path loss.

8. The radio frequency spectrum management apparatus according to claim 7, wherein the circuitry is further configured to:

estimate the path losses at positions near a position having updated path loss; and update the path losses in the database by using the estimated path loss.

9. The radio frequency spectrum management apparatus according to claim 1, wherein the circuitry is further configured to:

acquire the path loss information of a predetermined range of a movement destination for the secondary user according to the movement destination; and determine a movement target position of the secondary user based on the path loss information of the predetermined range of the movement destination, so that the usage of frequency spectrums after the secondary users move to the movement target position satisfies with a disturbance tolerance of the primary systems.

10. A secondary user apparatus, comprising:

circuitry configured to receive frequency spectrum adjusting information determined based on path loss information at positions before and after a movement of respective secondary user groups respectively, at least one of the secondary user groups comprising a plurality of secondary users, the at least one of the secondary user groups including the secondary user apparatus, the secondary users being grouped into the secondary user groups by dividing the secondary users in terms of at least one of distances between the respective secondary users and a reference secondary user and path loss similarities with path loss of the reference secondary user by dividing at least one of the distances and the path loss similarities using at least a threshold; and perform an adjustment to its usage of a frequency spectrum based on the frequency spectrum adjusting information, so that the adjusted usage of the frequency spectrum of the secondary user apparatus satisfies with a disturbance tolerance of primary systems, wherein a secondary user whose path loss is closest to a mid-value of a certain path loss interval is selected as the reference secondary user.

11. The secondary user apparatus according to claim 10, wherein, the circuitry is further configured to:

receive a signal including information of transmitting power transmitted from a radio frequency spectrum management apparatus;

calculate path loss information of the position where the secondary user apparatus is located according to receiving power for receiving the signal and the information of transmitting power; and transmit the path loss information of the position to the radio frequency spectrum management apparatus.

12. The secondary user apparatus according to claim 10, wherein, the circuitry is further configured to:

transmit to a radio frequency spectrum management apparatus a signal including position information of the secondary user apparatus and information of transmitting power, so that the radio frequency spectrum management apparatus receives the signal; and calculate path loss information at a position where the secondary user apparatus is located.

13. A radio frequency spectrum management method for a cognitive radio system comprising primary systems and secondary systems, the radio frequency spectrum management method comprising:

acquiring, according to position variation information of respective secondary user groups in the secondary systems, path loss information at positions before and after a movement of the respective secondary user groups respectively, wherein, at least one of the secondary user groups comprises a plurality of secondary users, and the secondary users are grouped into the secondary user groups by dividing the secondary users in terms of at least one of distances between the respective secondary users and a reference secondary user and path loss similarities with path loss of the reference secondary user by dividing at least one of the distances and the path loss similarities using at least a threshold; and determining, using circuitry, an adjustment to a usage of frequency spectrums of the secondary user groups, according to a variation of the path loss information at the positions before and after the movement of the respective secondary user groups, wherein a secondary user whose path loss is closest to a mid-value of a certain path loss interval is selected as the reference secondary user.

14. The radio frequency spectrum management method according to claim 13, wherein, the acquiring the path loss information comprises acquiring, according to the position variation information of the respective secondary user groups, the path loss information at the positions before and after the movement of the respective secondary user groups respectively from a predetermined path loss database.

15. The radio frequency spectrum management method according to claim 13, wherein the determining the adjustment to the usage of the frequency spectrums of the secondary systems comprises: determining, according to the variation of the path loss information at the positions before and after the movement of respective secondary user groups, secondary user groups having a difference between the aggregation disturbances to the primary system before and after the movement larger than a first predetermined threshold, as the secondary user groups whose usage of frequency spectrum needs to be adjusted.

16. The radio frequency spectrum management method according to claim 15, wherein the determining the adjustment to the usage of the frequency spectrums of the secondary systems further comprises: calculating, with respect to at least one of the secondary users in the secondary user groups determined as those whose usage of frequency spectrum needs to be adjusted, the maximum transmission power of each secondary user that is tolerable for the primary system according to path loss information of the secondary user, so as to determine the adjustment to the transmission power of the secondary user according to the maximum transmission power.

17. The radio frequency spectrum management method according to claim 15, wherein the determining the adjustment to the usage of the frequency spectrums of the secondary systems further comprises: determining, in a case that the secondary system has only one secondary user group, the secondary user group as the secondary user group whose usage of frequency spectrum needs to be adjusted when the secondary user group has a difference between path losses at the positions before and after the movement larger than a predetermined path loss difference.

18. A secondary user apparatus, comprising:
circuitry configured to
acquire path loss information at positions before and after a movement of respective secondary user groups respectively, at least one of the secondary user groups comprising a plurality of secondary users, the at least one of the secondary user groups including the secondary user apparatus, the secondary users being grouped into the secondary user groups by dividing the secondary users in terms of at least one of distances between the respective secondary users and a reference secondary user and path loss similarities with path loss of the reference secondary user by dividing at least one of the distances and the path loss similarities using at least a threshold; and determine a movement target position of the secondary user apparatus based on the path loss information, so that a usage of frequency spectrum after the secondary user apparatus moves to the movement target position satisfies a disturbance tolerance of primary systems, wherein
a secondary user whose path loss is closest to a mid-value of a certain path loss interval is selected as the reference secondary user.

19. The secondary user apparatus according to claim 18, wherein,
the circuitry is further configured to: determine positions within a predetermined range of a movement destination for the secondary user apparatus and having such a path loss that a difference in the path loss between the movement target position of the secondary user apparatus and the position where the secondary user apparatus is located is smaller than a second predetermined threshold, as the movement target position of the secondary user apparatus, according to the path loss information.

* * * * *